July 9, 1968
L. JUNCO
3,391,616
CONTROL CIRCUIT FOR SQUARING EQUIPMENT
Filed June 3, 1966
7 Sheets-Sheet 1
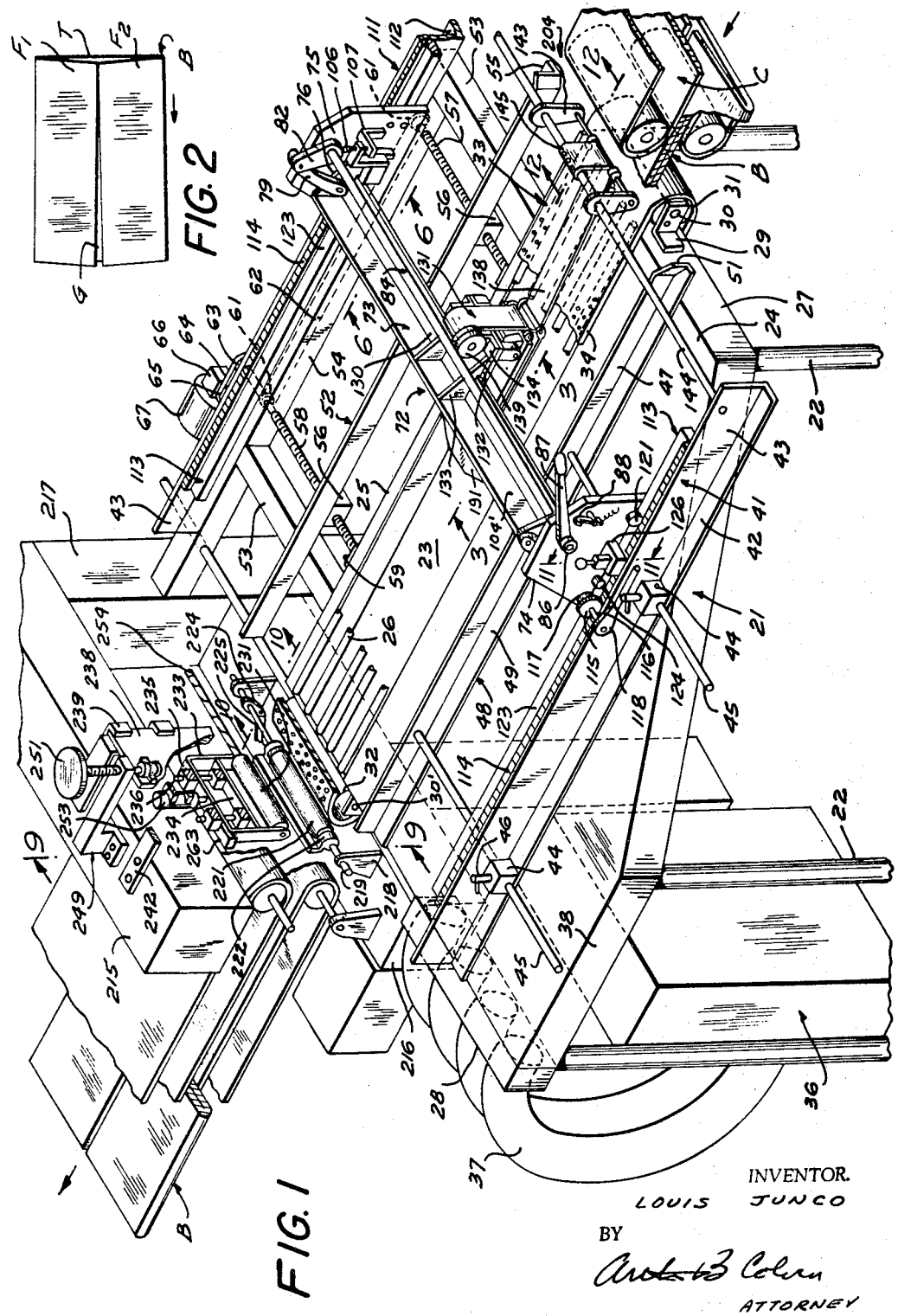
INVENTOR.
LOUIS JUNCO
BY
ATTORNEY

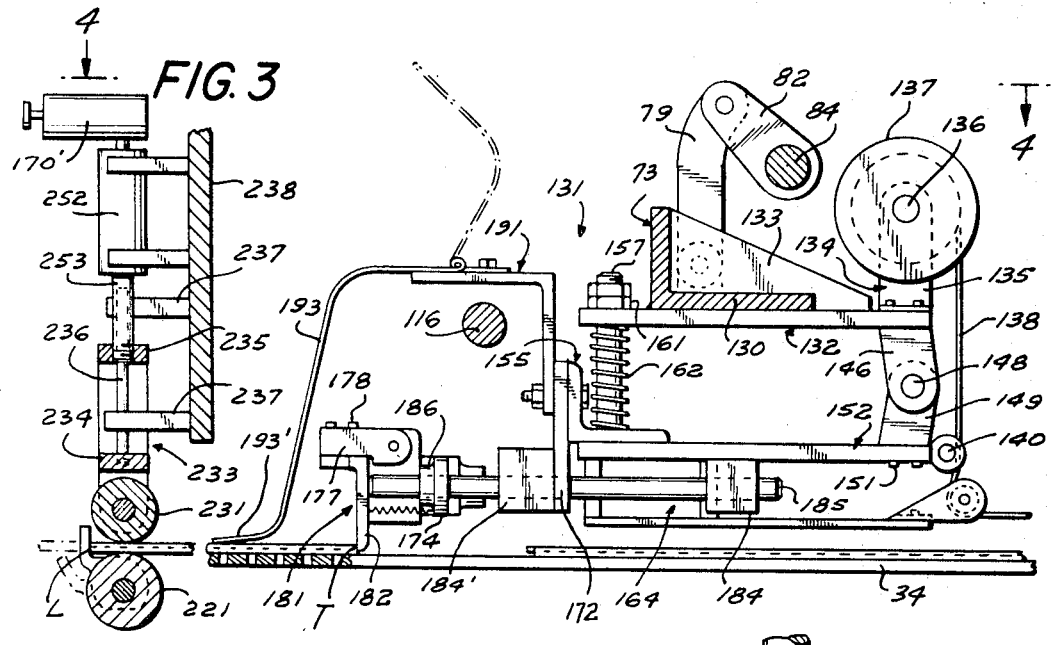
FIG. 3
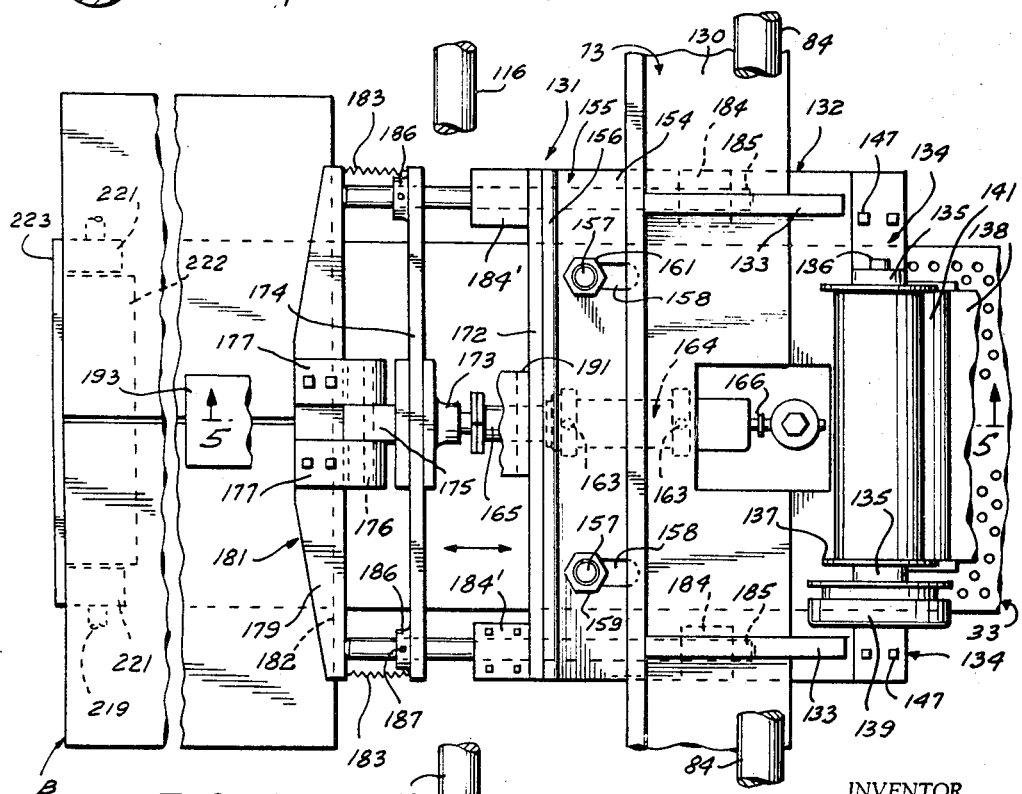
FIG. 4
INVENTOR.
LOUIS JUNCO
BY
ATTORNEY

FIG. 5

July 9, 1968 L. JUNCO 3,391,616
CONTROL CIRCUIT FOR SQUARING EQUIPMENT
Filed June 3, 1966 7 Sheets-Sheet 4

INVENTOR
LOUIS JUNCO
BY
ATTORNEY

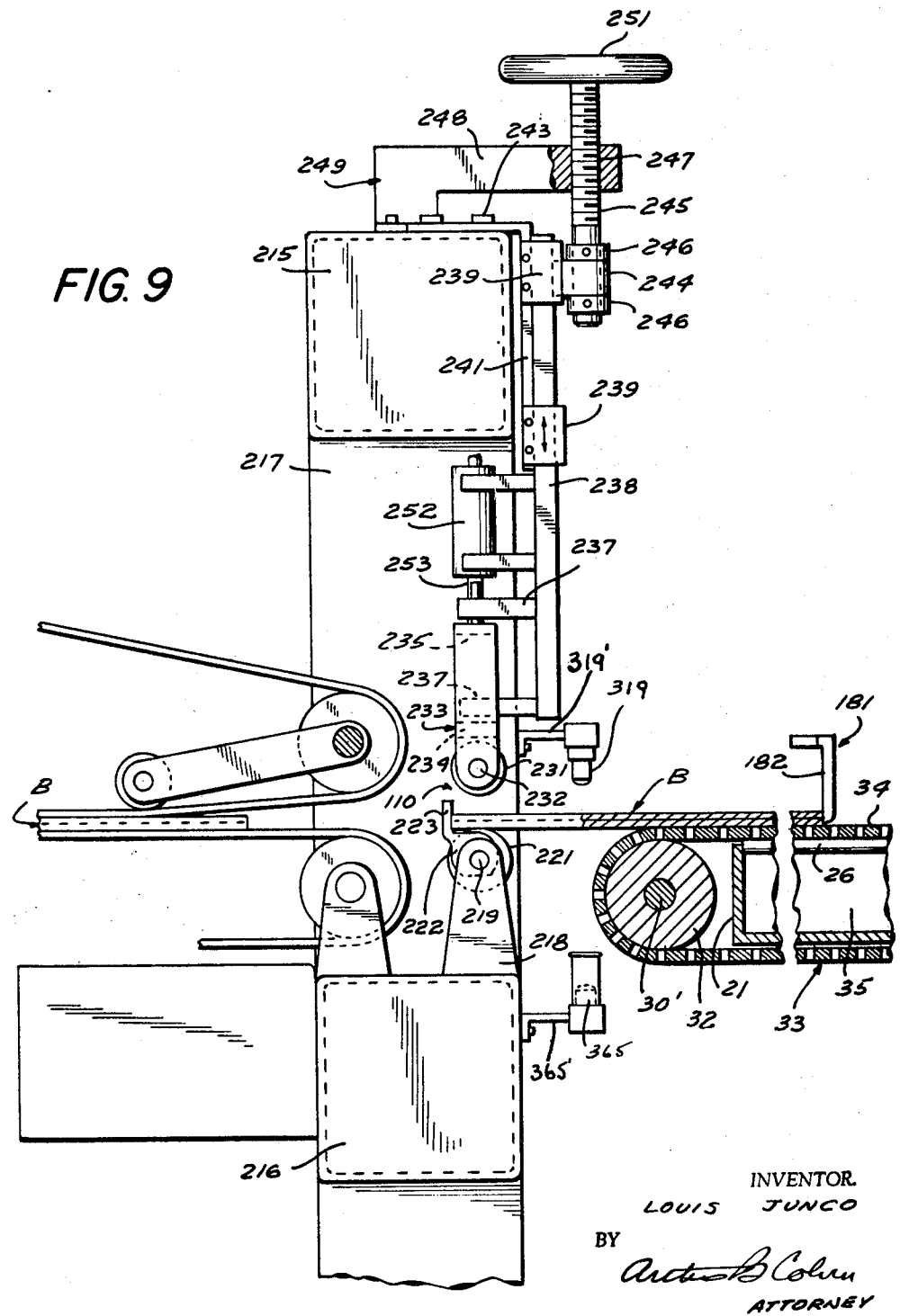

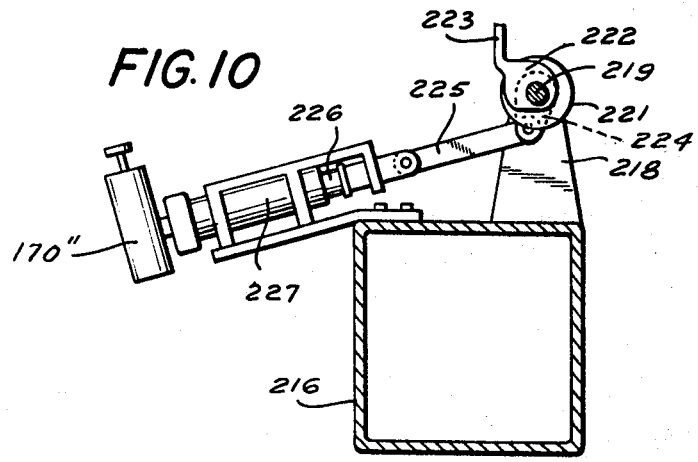
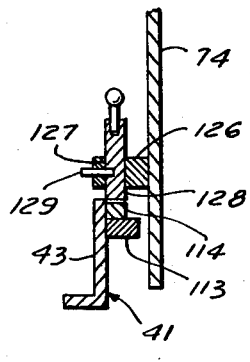
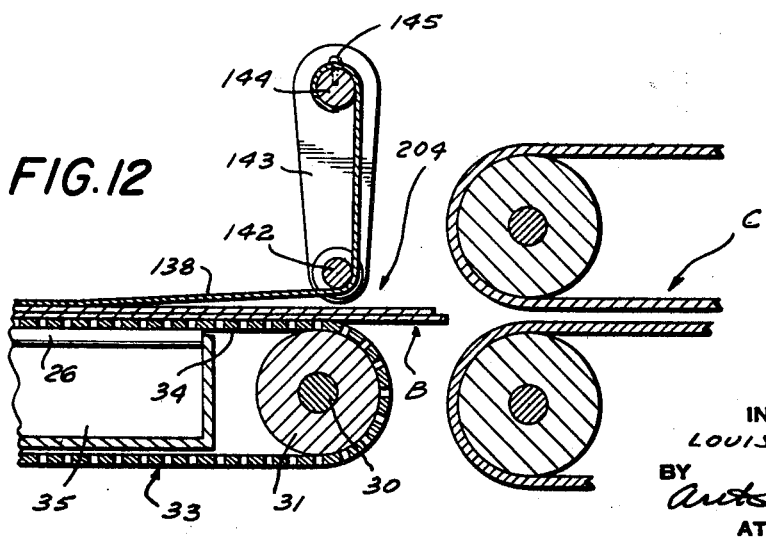

July 9, 1968
L. JUNCO
3,391,616
CONTROL CIRCUIT FOR SQUARING EQUIPMENT
Filed June 3, 1966
7 Sheets-Sheet 7
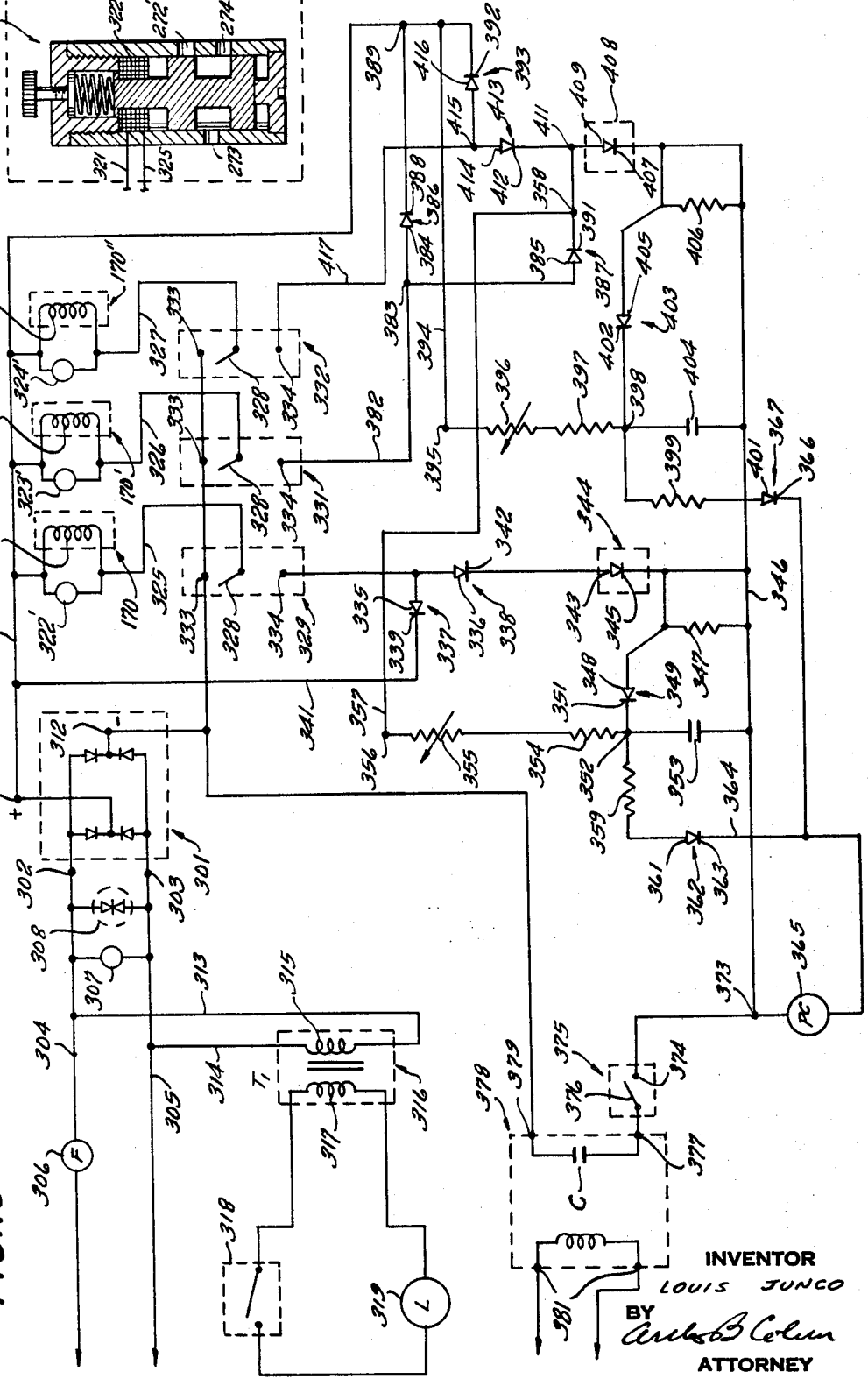
INVENTOR
LOUIS JUNCO
BY
ATTORNEY United States Patent Office 3,391,616
Patented July 9, 1968

3,391,616
CONTROL CIRCUIT FOR SQUARING
EQUIPMENT
Louis Junco, Colonia, N.J., assignor to Universal Corrugated Box Machinery Corporation, Cranford, N.J., a corporation of New Jersey
Filed June 3, 1966, Ser. No. 555,137
10 Claims. (Cl. 93—36)

ABSTRACT OF THE DISCLOSURE

This invention relates to the art of squaring equipment for folded boxes of the type that comprise four panels in side by side relation that have been pre-scored to facilitate folding of the two outer panels into substantially edge to edge juxtaposition.

Brief summary and background

Figure 6:
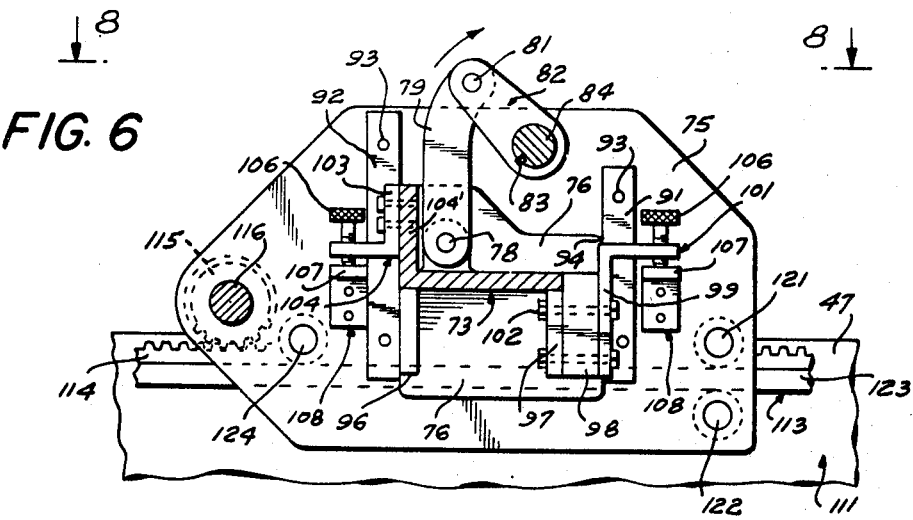

As conducive to an understanding of the invention, it is noted that during the normal automatic folding of corrugated box blanks by belt folders of the type shown in U.S. Patent No. 3,122,069, issued Feb. 25, 1964, since the folding belts of the folder are spiralled 180 degrees to effect corresponding progressive folding of the outer panels of the blanks, the outer panels will be in the spiral portion of the folding belts while the other panels will be advanced by the horizontal conveyer associated with the folding belts.

Since the outer panels will take a longer time to reach the outlet of the folding equipment than the other panels moved by the horizontal conveyer, due to the delay imparted by the spiral portion of the folding belts, it is apparent that the outer panels may not be aligned with the other panels.

As a result of such lack of alignment, the resultant box will not be square and hence cannot be opened properly for filling, without breaking of the corners of the box so that such improperly formed box must be discarded with resultant waste.

Furthermore, where the folded box blanks are opened by automatic equipment, if they are not truly square, such automatic equipment will not function properly.

Where to square such box blanks, equipment of the type shown in co-pending application Ser. No. 407,927, filed Oct. 30, 1964, now Patent No. 3,354,796, is used which provides a pivoted front gate or alignment member against which the leading edge of the box blank abuts; a pusher member which presses against the trailing edge of such box blank to force its leading edge against the gate to square the box blank, and a presser roller which moves downwardly against the top of the squared box blank to retain the latter in squared condition, and a plurality of micro-switches are provided which are actuated by the moving box blank to operate the various elements of the equipment in timed sequence, where the conveyer operates at a high rate of speed, the resultant vibration and impact of the rapidly moving blanks against the actuating members of the micro-switches causes breakdown of the micro-switches and hence necessitates frequent stoppage for repair.

The problem is enhanced when relatively small box blanks are to be squared as the micro-switches would be actuated at a correspondingly faster rate.

It is accordingly among the objects of the invention to provide a squaring equipment which will dependably advance folded box blanks in sequence at a relatively high rate of speed and will automatically align the panels of the folded box blank, thereby providing a folded box that is square and which may be opened without breakage of the corners thereof, which equipment includes a front alignment member or gate against which the leading edge of the folded box blank abuts; a movable pusher member which reacts against the trailing edge of the box blank to force it against the gate to effect the squaring action and a presser roller which is moved downwardly against the top of the squared box blank to retain the latter in squared condition and in which the gate, the pusher member and the presser roller are operated in timed sequence based upon the movement of the box blank without the need for any micro-switches or other controls to be engaged by the moving box blank.

According to the invention, these objects are accomplished by the arrangement and combination of elements hereinafter described and more particularly recited in the claims.

Figure 7:
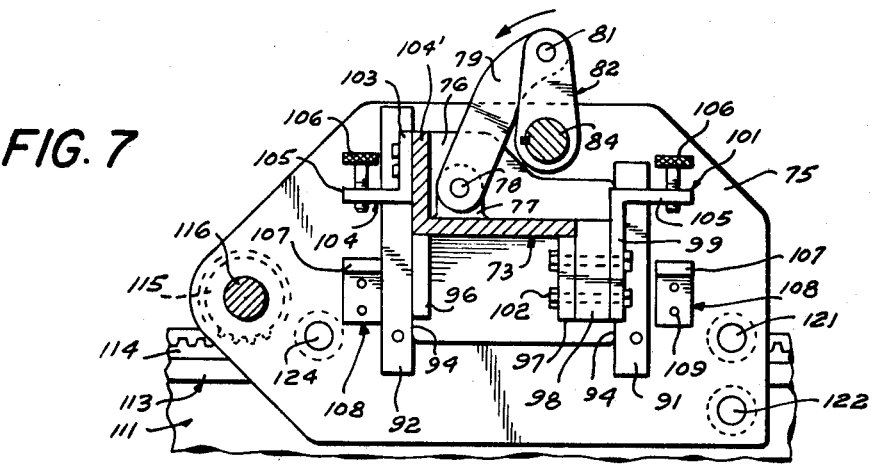
Figure 8:
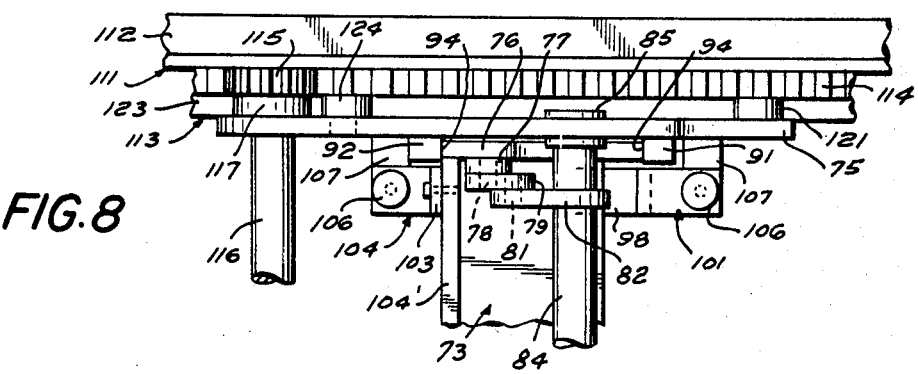

In the accompanying drawings in which is shown one or more of various possible embodiments of the several features of the invention, FIG. 1 is a perspective view of the squaring equipment with parts broken away, FIG. 2 is a plan view of a typical folded box blank before it is squared, FIG. 3 is a side elevational view of the squaring unit, on a larger scale, and partly in section taken along line 3—3 of FIG. 1, FIG. 4 is a plan view taken along line 4—4 of FIG. 3, FIG. 5 is a view similar to FIG. 3 on an enlarged scale taken along line 5—5 of FIG. 4, FIG. 6 is a view taken along line 6—6 of FIG. 1, showing the mount for the squaring unit, on a larger scale, with the mount in its lower position, FIG. 7 is a view similar to FIG. 6 with the mount in its upper position, FIG. 8 is a plan view taken along line 8—8 of FIG. 6, FIG. 9 is a side elevational view partly in cross section taken along line 9—9 of FIG. 1 and on an enlarged scale, FIG. 10 is a detail sectional view taken along line 10—10 of FIG. 1 and on an enlarged scale showing the front alignment bar actuator, FIG. 11 is a detail sectional view on an enlarged scale showing the locking mechanism for the squaring unit mount, and taken along line 11—11 of FIG. 1, FIG. 12 is a detail sectional view taken along line 12—12 of FIG. 1 showing the inlet to the squaring equipment, FIG. 13 is a diagrammatic view of the control circuit for the equipment, and FIG. 14 is a sectional view of a solenoid valve.

Referring now to the drawings, as shown in FIG. 1, the equipment comprises a hollow casing 21 which is supported in a horizontal plane by suitable standards 22. The casing 21 has an elongated rectangular opening 23 in its top wall 24 adjacent the side wall 25 thereof and a plurality of spaced parallel support rods 26 extend the length of said opening.

Extending outwardly from the ends 27, 28 of the casing adjacent side edge 25 thereof and aligned with said openings 23 (FIG. 1) are a pair of spaced parallel brackets 29, each pair of which mounts a pulley 31, 32 on an associated shaft 30, 30'. A perforated conveyer belt 33 encompasses said pulleys 31, 32 as well as the portion of said casing 21 having said opening 23, so that the upper run 34 of said conveyer belt extends over said opening 23, supported by the parallel support rods 26 as is clearly shown in FIG. 1.

The interior of said casing 21 defines a suction chamber 35 and a conventional suction blower 36 is provided driven in any suitable manner and having its suction lines 37 connected to the end wall 28 of the casing as shown in FIG. 1 adjacent the side wall 38 thereof.

Means are provided to guide a box blank B positioned on the conveyer belt 33.

To this end, as shown in FIG. 1, an L-shaped angle beam 41 is provided having its horizontal leg 42 secured as by welding to the top wall 24 of the casing 21 on the side of opening 23 adjacent the wall 38 thereof and extending parallel to the adjacent edge of elongated opening 23.

Secured to the vertical leg 43 of the beam 41 and spaced along the length thereof are blocks 44 each of which has a horizontal bore through which extends an associated rod 45, the position of said rods being set by means of a set screw 46 extending vertically through each block.

The free inner end of each of the rods 45 is secured to the vertical wall 47 of an L-shaped angle bar 48, the horizontal leg 49 of which rests on the top wall 24 and is directed outwardly toward angle beam 41.

As shown in FIG. 1, the vertical leg 47 of angle bar 48 presents a guide surface and the outer end thereof is flared outwardly as shown at 51.

Thus, the angle bar 49 and the associated support therefor serves as one side of the guide means for the box blanks B.

The other side of the guide means comprises an L-shaped angle bar 52 similar to angle bar 48 and which in conjunction therewith serves to form the guide channel for the box blanks B.

The angle bar 52 is mounted so that it may automatically be moved toward and away from angle bar 48 to adjust the spacing therebetween, depending upon the width of the box blank B to be accommodated.

To this end, as is shown in FIG. 1, a pair of spaced parallel support bars 53 are secured at one end as by welding to the side wall 25 of the casing 21 and extend outwardly therefrom, the outer ends of bars 53 being joined by a bar 54 which extends parallel to side wall 25.

The horizontal leg 55 of angle bar 52 mounts a pair of blocks 56 on the undersurface thereof and spaced along the length thereof, each of said blocks having a horizontal threaded bore through which extends an associated threaded rod or screw 57, 58.

One end of each screw 57, 58 is rotatably mounted in a suitable bearing 59 secured to side wall 25. The other end of each screw is rotatably mounted in a suitable bearing carried by the bar 54 and each of said outer ends mounts a sprocket wheel 61 connected by a sprocket chain 62.

The screw 58 also mounts a pulley 63 at its outer end which is connected by a belt 64 for example, to a pulley 65 driven through gear box 66 by a reversible motor 67 mounted on bar 54.

Thus, depending upon the direction of rotation of motor 67, the screws can be rotated in a corresponding direction to cause the angle bar 52 to move toward and away from angle bar 48 to adjust the spacing therebetween.

Associated with the casing 21 is a movable mount or carriage 72 (FIG. 1) which comprises an L-beam 73 extending transversely across the conveyer belt 33 and supported at its ends on upstanding parallel plates 74, 75 (FIGS. 6–8).

Each end of the L-beam 73 has a wall 76 secured thereto and extending in a plane at right angles to the length of the beam 73. Secured to the inner surface of each wall 76 is a block 77 to which is pivotally mounted as at 78 one end of a curved link 79, the other end of which is pivotally connected as at 81 to an associated lever arm 82, keyed as at 83 to a torsion rod 84 which extends through said lever arms 82 and through the plates 74, 75, being rotatably mounted in suitable bearings 85 secured to the outer surface of each of said plates.

The end 86 (FIG. 1) of rod 84 extending through the bearing 85 mounted on plate 74 has secured thereto one end of an actuating handle 87 which may be releasably latched in actuated position by a spring urged hook 88.

With the construction above described, referring to FIGS. 1, 6–8, when the actuating handle 87 is moved in a clockwise direction from the position shown in FIG. 1, the rod 84 will rotate in a corresponding direction, and through the linkage comprising lever arms 82 and links 79, will lift the L-beam 73 from the position shown in FIG. 6, to the position shown in FIG. 7 to provide access to the conveyer belt 33.

As the handle 87 moves past the spring urged hook 88, the latter will first be moved inwardly to permit passage of the free end of handle 87 and then will snap outwardly to engage the handle, releasably to retain the L-beam 73 in its uppermost position as shown in FIG. 7.

Means are provided to guide the L-beam 73 vertically as it is moved by the actuating handle 87. To this end, a pair of rectangular guide bars 91, 92 (FIGS. 6–8) are secured by bolts 93 to the inner surface of each of the plates 74, 75 to define spaced parallel vertical tracks, the vertical side edges 94 of the end walls 76 being straddled by said guide bars.

In order adjustably to limit the downward movement of the L-beam, as shown in FIGS. 6–8, a pair of parallel reinforcing struts 96, 97 are secured as by welding to the undersurface of the L-beam at each end thereof and to the associated end wall 76. Positioned against the outer surface of each of the struts 97 is a block 98 and the vertical leg 99 of an L-bracket 101 is secured as by bolts 102 to the struts 97, the bolts also extending through block 98. Similarly, the vertical leg 103 of an L-bracket 104 is secured to the vertical leg 104′ of L-beam 73.

The outwardly extending horizontal leg 105 of each bracket 101, 104 mounts a rotatable adjustment screw 106 which is designed to abut against the horizontal leg 107 of an associated L-bracket 108 secured as by bolts 109 to the plates 74, 75.

Thus, by adjustment of any one of the screws 106 due to the linkage 79, 82 to rod 84, the downward movement of the L-beam 73 is uniformly limited.

Means are provided to afford longitudinal movement of the L-beam 73 toward and away from the outlet 110 (FIG. 9) of the squaring equipment.

To this end, as shown in FIG. 1, in addition to the L-shaped beam 41 (left side of FIG. 1) which carries the side gauge 48, a second L-shaped beam 111 (right side of FIG. 1) is provided, the horizontal leg 112 of which is secured to the top surface of side beam 54.

Each of the vertical legs 43 of beams 41, 111 has secured to the inner surface thereof a flat bar 113 which extends substantially the length of the associated L-beam 41, 111. The inner portion of bar 113 adjacent the vertical leg 43 of the associated L-beam is conformed as an elongated rack 114 which is engaged by an associated pinion 115 secured at each end of a rod 116 which extends transversely across the conveyer belt, through suitable bearings 117 mounted on each of the end plates 74, 75 (FIG. 8).

As shown in FIG. 1, the rod 116 extends through the associated pinion 115 and mounts a reversible ratchet bar 118 for manual rotation of rod 116 and pinions 115 thereon to move the carriage 72 in the desired direction.

To support the carriage, each of the plates 74, 75 at the side edge thereof remote from the edge mounting the pinion 115, has a pair of vertically spaced rollers 121, 122 thereon which straddle the inner portion 123 of bars 113 as shown in FIGS. 6 and 7.

An additional roller 124 carried by each of the plates 74, 75 also rides on the top surface of the inner portion 123 of the bars 113.

In order to lock the carriage 72 in adjusted position, referring to FIGS. 1 and 11, the plate 74 has an outwardly extending block 126 with a vertical rectangular slot 127 to receive a rectangular detent 128, the lower edge of which has teeth that engage the teeth on the rack bar 114 to lock the carriage in set position, a locking pin 129 preventing inadvertent release of detent 127.

The carriage 72 carries the squaring unit 131 which, as shown in FIGS. 1, 3–5, comprises a substantially rectangular mounting plate 132 secured as by welding to the undersurface of the horizontal leg 130 of L-beam 73 and externally at right angles thereto, said plate extending beyond the front and rear edges of said beam 73.

To reinforce the supporting plate 132, a pair of spaced parallel struts 133 are provided, secured as by welding to the L-beam and to the stop surface of plate 132 adjacent the side edges of the latter as shown in FIG. 4.

Positioned on the end of supporting plate 132 and rising therefrom are L-shaped brackets 134 between the vertical legs 135 of which a shaft 136 is mounted. The shaft 136 carries a reel 137 on which a belt 138 is wound, the belt being maintained under tension by a spring mechanism 139.

As is clearly shown in FIGS. 1, 3 and 5, the belt 138 rides over a bar 140 and around a roller 141, then extends rearwardly longitudinally of the conveyer belt 33, the belt 138 riding around a roller 142 (FIG. 13) carried by depending brackets 143 secured to a rod 144 extending transversely across the conveyer belt and mounted on L-beams 41, 111 and then is secured at its free end as at 145 to said rod.

The purpose of the belt 138 is to retain the flaps of the box blank B in closed position as the box blank B is advanced into the inlet 204 of the squaring equipment.

Depending from the end of the supporting plate 132 (FIG. 5) are spaced parallel bearing blocks 146 which are rigidly secured in place by bolts 147 which also retain the brackets 134 in fixed position on the supporting plate 132.

Extending through the free ends of the bearing blocks 146 is a shaft 148 which pivotally mounts one end of a pair of pivot arms 149, secured at their free ends as by screws 151 to the end of a plate 152 which is positioned beneath the supporting plate 132 so that the plate 152 is pivotally supported beneath the plate 132.

As shown in FIG. 5, there is secured as by welding to the edge 150 of plate 152 remote from bar 140, the horizontal leg 154 of an L-shaped beam 155, the vertical leg 156 of which extends the width of said plate 152.

Secured to the horizontal leg 154 of beam 155 and rising therefrom are a pair of spaced parallel studs 157, the free upper ends of which are threaded and extend through slots 158 in the front portion 159 of supporting plate 132 as is clearly shown in FIGS. 4 and 5.

The free ends of rods 157 protruding from the slots in plate 132 have nuts 161 secured thereto and a coil spring 162 encompasses each of the rods, being compressed between the undersurface of plate 132 and the horizontal leg 154 of L-bar 155. Thus, the plate 152 is normally pivoted downwardly on its pivot 148, the movement being limited by the abutment of nuts 161 against plate 132.

Secured to the undersurface of plate 152 centrally thereof as by screws 163 and extending longitudinally thereof is an air actuator 164 illustratively of the spring return type, the piston rod 165 of which is urged outwardly by the application of air under pressure through fitting 166 and air line 167 controlled by an electric solenoid valve 170.

The piston rod 165 extends through an opening 171 in a rectangular plate 172 (FIGS. 4, 5) secured to the vertical leg 156 of L-shaped bar 155 and is adjustably secured to a block 173 which in turn is secured to a rectangular plate 174 that has a pivot block 175 secured centrally thereto.

As is shown in FIGS. 4 and 5, a pivot pin 176 extends through the block 175 and through a pair of arms 177 which straddle the block 175 and which are secured as by screws 178 to the horizontal top leg 179 of an L-shaped pusher member 181. The pusher member 181 is normally urged so that its leg 182 is in vertical position against the pivot block 175 by springs 183.

In order to guide the pusher member, the plate 152 (FIGS. 3, 4) has a pair of guide blocks 184 secured to the undersurface thereof, through each of which extends a guide rod 185. Each of the rods 185 also extends through a block 184' secured to the front of plate 172 (FIG. 4) and through a bushing 186 carried by rectangular plate 174 and abuts at its free end against the vertical leg 182 of pusher member 181, the rods being locked in position in bushings 186 by set screws 187.

As is shown in FIGS. 3 and 5, an L-shaped bracket 191 is secured to plate 172 by bolts 192 which also secure plate 172 to L-bar 155 and the horizontal leg of the bracket 191 carries the end of a resilient presser strip 193, the free end 193' of which is designed to react against the folded box blanks B in the manner hereinafter to be described.

Associated with the pulley 32 at the outlet end of conveyer 33 is a rotatable stop mechanism which, in conjunction with the alignment member 181 produces the squaring action.

As shown in FIGS. 1, 9 and 10, a pair of vertically spaced support beams 215, 216 extend outwardly from a vertical standard 217. Secured to the top surface of beam 216 are upstanding parallel brackets 218 which rotatably mount a shaft 219. Idly mounted on said shaft 219 is a roller 221 which is straddled by hubs 222 through which shaft 219 extends, said hubs being secured to said shaft. The hubs 222 form the legs of a yoke, the cross piece 223 of which comprises a stop or alignment bar which is normally aligned with the top run 34 of conveyer belt 33 as is shown in FIG. 9.

Mounted on the end of shaft 219 is one end of a lever 224, the free end of which is pivotally connected to one end of a link 225, the other end of which is pivotally connected to the end of the piston rod 226 of an air actuator 227 secured to beam 216.

The air actuator 227 is preferably of the spring return type and in the retracted position the alignment bar 223 will be in vertical position as shown and in the extended position when electric solenoid valve 170", identical to valve 170, controlling application of air under pressure to actuator 227 is energized, the bar 223 will be rotated in a counterclockwise direction so that it is out of the path of movement of the box blank B.

As shown in FIGS. 1 and 9, there is associated with roller 221 and positioned above the latter, a vertically reciprocable roller 231 which is secured to a horizontal shaft 232 extending between the legs of a yoke 233.

A cross piece 234 is positioned beneath the cross piece 235 of the yoke and said cross piece 234 carries upright guide rods 236 which extend through suitable openings in blocks 237 extending laterally outward from vertical mounting plate 238 which supports the roller 231 and associated mechanism.

As is shown in FIGS. 1 and 9, the plate 238 which is rectangular, is slidably mounted between slotted side supports 239 secured to the depending legs 241 of L-brackets 242 which are secured by bolts 243 to the beam 215.

The plate 238 near its upper edge has an outwardly extending boss 244 with a vertical bore through which extends the end of an adjustment screw 245 which is freely rotatable in the bore. The screw has a pair of collars 246 secured thereto and straddling the boss 244 as is clearly shown in FIGS. 1 and 9.

The screw extends through a threaded opening 247 in the end of the horizontal arm 248 of an L-shaped bracket 249 secured to beam 215 and an adjustment wheel 251 is secured to the upper end of screw 245. Thus, upon rotation of wheel 251, the plate can be moved up and down as desired.

The plate 238 also carries an air actuator 252, also illustratively of the spring return type, the plunger 253 of which is secured to the cross piece 235 of the yoke 233 to raise and lower the roller 231, the latter normally being in its lower position and raised when electric solenoid valve 170' (also identical to valve 170) controlling air actuator 252, is energized.

As is shown in FIG. 1, a flexible shaft 254 is secured to the roller shaft 232 to rotate the latter, illustratively at a speed greater than the rate of advance of the conveyer belt 33.

In order to control the timed operation of the equipment, according to the invention the control circuit shown in FIG. 13 is provided.

The control circuit comprises a full wave rectifier 301 having input terminals 302, 303 connected to leads 304, 305 which in turn are connected to a source of A.C. potential. A fuse 306 is connected in series in lead 304 and a pilot light 307 is connected across said leads 304, 305. In addition, a pair of diodes 308 of conventional type connected back to back are also connected across leads 304, 305 to act as a surge suppressor to prevent high voltage surges being applied to rectifier 301.

The full wave rectifier which may be of any conventional type and preferably is of the solid state type has output terminals 311, 312, the former being positive and the latter negative.

Connected by leads 313, 314 to leads 304, 305 is the primary winding 315 of a transformer 316, the secondary winding 317 of which is connected in series with a switch 318 and a light source 319.

The positive terminal 311 of rectifier 301 is connected by lead 321 to one side of the coils 322, 323, 324 of solenoid valves 170, 170', 170" which respectively control the pusher member 181, the drive roller 231 and the gate 223.

The other side of each coil 322, 323, 324 is connected by associated leads 325, 326, 327 to contact arm 328 of a single pole double throw switch 329, 331, 332, pilot lamps 322', 323' and 324' being connected in parallel with each coil respectively.

The fixed contacts 333 of said switches are connected to negative terminal 312 so that when the contact arm 328 engages said fixed contacts 333, the associated solenoid valves 170, 170', 170" will be energized.

In the normal position of said solenoid valves when they are not energized, the pusher member 181 is retracted, the roller 231 is raised, and the gate 223 is in stop position.

The fixed contact 334 of switch 329 is connected to the anodes 335, 336 of diodes 337, 338. The cathode 339 of diode 337 is connected by leads 341 to positive lead 321. The cathode 342 of diode 338 is connected to the anode 343 of a silicon rectifier 344, the cathode 345 of which is connected to common lead 346.

Also connected to cathode 345 of rectifier 344 is one end of bias resistor 347, the other end of which is connected to lead 346. The resistor 347 is also connected to the anode 348 of Zener diode 349, the cathode 351 of which is connected to junction 352.

Connected between junction 352 and lead 346, is a capacitor 353. One end of a fixed resistor 354 of say 20K ohms is connected to junction 352 and the other end of resistor 354 is connected to one end of variable resistor 355 of say 100K ohms, the other end of resistor 355 being connected to terminal 356 and by lead 357 to junction 358. The junction 352 is also connected to one end of resistor 359 say of 220 ohms, the other end of resistor 359 being connected to the anode 361 of diode 362, the cathode 363 of which is connected by lead 364 to one side of a photocell 365 and to the cathode 366 of diode 367.

The other side of the photocell 365 is connected to junction 373 to which common lead 346 is connected and also to fixed contact 374 of single pole single throw standby run switch 375.

The photocell 365 as shown in FIG. 9 is mounted on a bracket 365' secured to the beam 216 and is positioned between the roller 32 of conveyor 33 and gate 223 closely adjacent the latter. The photocell 365 is directed upwardly so that the box blank B will pass over the photocell to intercept the light from the light source 319 mounted directly over the photocell 365 on bracket 319' secured to plate 238.

The contact arm 376 of switch 375 is connected to terminal 377 of a timer 378, the terminal 379 of said timer being connected to negative terminal 312. The input terminals 381 of the timer are connected to the start-stop control for the drive motor of the squaring equipment so that only after the start control is energized will the timer 378 be energized.

The fixed contact 334 of switch 331 is connected by lead 382 to junction 383 which is connected to the anodes 384, 385 of diodes 386, 387. The cathode 388 of diode 386 is connected to junction 389, to which lead 321 is connected and the cathode 391 of diode 387 is connected to junction 358. The junction 389 is connected to the cathode 392 of diode 393 and by lead 394 to junction 395 to which is connected one end of variable resistor 396, say of 100K ohms, the other end of the resistor being connected to one end of resistor 397, say of 20K ohms, the other end of which is connected to junction 398.

The junction 398 is connected through resistor 399 say of 220K ohms to the anode 401 of diode 367, and to the cathode 402 of Zener diode 403. A capacitor 404 is connected between junction 398 and lead 346.

The anode 405 of diode 403 is connected to one end of bias resistor 406 of say 1K ohm and to the cathode 407 of silicon rectifier 408. The other end of resistor 406 is connected to lead 346.

The anode 409 of rectifier 408 is connected to junction 411 which is connected to junction 358 and to the cathode 412 of diode 413, the anode 414 of which is connected to junction 415 and then to the anode 416 of diode 393 and by lead 417 to fixed contact 334 of switch 332.

*Operation*

In the operation of the equipment above described, folded box blanks B are to be advanced one by one by feed conveyer C (FIG. 1) between belt 138 and the upper run of suction conveyor belt 33.

As the top flaps F1, F2 (FIG. 2) may not be in alignment, as shown, the equipment is designed to square such flaps.

The equipment is first adjusted, depending upon the size of the box blank B to be squared.

To set up the squaring equipment, the main power switch (not shown) is turned on to energize the full wave rectifier 301, any high voltage surges being bypassed by diodes 308.

As a result, a D.C. voltage will appear across terminals 311, 312, being positive at terminal 311 and negative at terminal 312. In addition, the transformer 316 will be energized, but the light source 319 will not be energized until switch 318 is closed.

Since the start-stop switch (not shown) has not been closed, to start the motors of the squaring equipment, the contacts C of the timer 378 are open and the photocell 365 and associated control circuitry is not yet operative.

At this time, the contact arm 328 of switch 329 is moved to engage fixed contact 333. As a result, a circuit will be completed from negative terminal 312, contacts 333, 328 of switch 329, lead 325 through coil 322 of pusher solenoid valve 170 to lead 321 and positive terminal 311. In addition, lamp 322' connected across coil 322 will be illuminated.

The valve 170, which may be of any conventional type, has an air inlet 272' connected to a source of air under pressure, an air outlet 273 connected to the inlet of air actuator 164 and a vent 274. The valve 170 is normally spring urged to connect the inlet of actuator 164 to vent 274 and when valve 170 is actuated it will cut off the vent and connect the source of air pressure to the air outlet 273.

Since the actuator 164 is normally spring urged to retract the alignment member 182, when switch 329 is closed to energize solenoid valve 170, the air under pressure will be applied to the actuator to extend the alignment bar 182 to its most forwardmost position.

Thereupon, the box blank B to be squared is positioned on the conveyor 33 with its leading edge L against the front alignment bar or gate 223, which is normally in its upper or stop position when its associated solenoid valve 170" is not energized. With the detent 128 (FIG. 11) removed, the ratchet bar 118 is operated to move the carriage to the left (FIGS. 1 and 2) until the extended alignment member 182 abuts against the trailing edge T of the box blank. The carriage is moved sufficiently to the left so that the box blank preferably is slightly bowed to make sure that proper squaring thereof will occur.

When the carriage is thus set, the detent 128 is positioned to lock the carriage in set position. Due to the spring urged reel, the belt 138 will play off the reel with such movement of the carriage.

Thereupon, the contact arm 328 of switch 331 is moved to engage the associated fixed contact 333. This will complete a circuit from negative terminal 312, closed contacts 328, 333 of switch 331, lead 326, coil 323 of solenoid valve 170', lead 321 to positive terminal 311. In addition, lamp 323' connected across coil 323 will be illuminated.

As a result of the energization of roller solenoid valve 170' which controls air actuator 252 which is spring urged to lift roller 231, such roller 231 will be moved downwardly to clamp the box blank against roller 221 associated with the gate 223.

If the roller 231 is not pressing firmly against the box blank, the hand wheel 251 is rotated to move the plate 238 and the air actuator thereon downwardly until the roller is properly set.

Thereupon, the switch 329 is opened to de-energize the pusher solenoid valve 170 and the contact arm 328 of switch 332 is moved to energize contact 333 to complete the circuit from negative terminal 312 through gate solenoid valve 170" to positive terminal 311. As a result, the lamp 324' will be illuminated and the gate 223 will be pivoted in a counterclockwise direction, i.e., to open position.

The start-stop switch is then closed to start the conveyor belt motor as well as the roller drive motor so that the box blank B just set up will be discharged from the equipment.

Since switches 318 and 375 are open, the photocell and associated circuitry will not be operative.

At this time, the contact arms 328 of switches 329, 331, 332 are moved to engage their associated fixed contacts 333, i.e., to "Run" position, and switches 318 and 375 are closed to energize light 319 and the control circuitry.

When the start-stop switch was moved to "Start" position, the timer 378 was energized and after, say, three seconds, its contacts C closed. The purpose of this time delay is to prevent the heavy starting currents of the main drive motors causing voltage surges in the control circuitry.

In addition, when the start-stop switch was moved to "Start" position, the blower 36, the drive for conveyor 33 (not shown) and the conveyor C are energized and the folded box blanks B will be fed one by one into the inlet 204 of the squaring equipment with the gap G between the flaps F1, F2 longitudinally aligned with the path of movement of the conveyor 33.

As the blank B enters the inlet between the conveyor belt 33 and the belt 138, the latter will prevent the flaps F1, F2 from opening and the suction applied through the perforations in belt 33 will firmly retain the box blank B against the belt and advance such blank.

Assuming that only one box blank B has been fed by conveyor C, such blank will be advanced by the suction conveyor belt.

As soon as switches 329, 331, 332 are set to "Run" position, current will flow from terminal 311, lead 321, coil 324 of solenoid valve 170", closed contacts 328, 334 of switch 332, lead 417, diode 413, junctions 411, 358, lead 357 to terminal 356 and through resistors 355, 354 and capacitor 353 to lead 346 connected through closed switch 375 and closed contacts C of timer 378 to negative terminal 312.

In addition, current will flow from positive terminal 311, lead 321, junction 389, lead 394 to terminal 395 and through resistors 396, 397 and capacitor 404 to lead 346 and thence as above described to negative terminal 312.

As resistor 355 is set to 50K ohms, whereas resistor 396 is set to 75K ohms, the capacitor 353 would charge before capacitor 404. However, before any blank intercepts the light from the source 319 projected against photocell 365, the illuminated photocell 365 will provide a very low resistance of say 35 ohms in series with resistors 359, 399 respectively. As a result, the capacitors 353, 404 in parallel with the photocell 365 and the resistors 359, 399 respectively, which also are of low resistance say, 220 ohms, will not be able to build up any charge as they will discharge through such low resistance path.

With continued forward movement of the box blank to be squared, its leading edge L will strike against the rear of the alignment member 182 and as it is pivoted, it will move clear of the box blank so that the latter is free to pass thereunder.

Thereupon, the leading edge L will intercept the light from the source 319 projected against photocell 365 and almost immediately thereafter such leading edge will abut against the alignment member or gate which is in its "stop" position when the associated solenoid 170" is not energized.

As soon as the beam of light to the photocell 365 is interrupted, the photocell presents a very high resistance, say 20 megohms in series with resistors 359, 399 respectively, which have a value of say 220 ohms and as these resistors are in parallel with capacitors 353, 404 respectively they will immediately start to charge and as previously described, capacitor 353 will charge before capacitor 404.

When capacitor 353 charges sufficiently, Zener diode 349 will conduct so that current will flow through resistor 347. As a result, the cathode 345 of rectifier 344 will be biased so that it can conduct and current will flow from negative lead 346 through diode 338, contacts 334, 328 of switch 329 and through the coil 322 of solenoid valve 170 to positive terminal 311 to energize the solenoid valve 170 controlling air actuator 164 and the plunger 165 thereof will move forwardly against its return spring. As a result, the alignment member 182 will move forwardly against the trailing edge of the box blank which has moved in front of the alignment member by this time.

As a result of the force exerted by the alignment member 182 against the trailing edge T of the box blank B, the front edges of the top flaps F1, F2 will be moved against the front alignment member 223 and hence the top flaps F1, F2 will be moved backwardly slightly thereby squaring the flaps.

Almost immediately after the pusher solenoid valve 170 has been energized to square the box blank, the charge on capacitor 404 will have built up sufficiently so that Zener diode 403 will conduct. As a result of the current flow through bias resistor 406, the rectifier 408 will be biased so that it will also conduct.

As a result, a circuit will be completed from negative lead 346, through conducting rectifier 408, junction 411, 358, diode 387, junction 383, lead 382, closed contacts 334, 328 of switch 331, coil 323 of roller solenoid valve 170' to positive lead 311. Thus, the solenoid valve 170' controlling air actuator 252 will be energized causing the plunger 253 thereof and the yoke and driven roller 231 carried thereby to move downwardly against the squared box blank held against front alignment member 223 by rear alignment member 182.

When the driven roller 221 engages the top flaps F1, F2, it will retain such flaps in squared position and tend to urge the box blank forwardly.

Substantially simultaneously with the energization of the roller solenoid valve 170', since a circuit will also have been completed through conducting rectifier 408, junction 411, diode 413, junction 415, lead 417, closed contacts 334, 328 of switch 332, coil 324 of gate solenoid valve 170" to positive lead 311, the gate solenoid valve 170" will be energized to pivot the front alignment member or gate 223 out of the path of the squared box blank which will be advanced past the lowered gate by the driven roller 221.

As a result, the driven roller 231 will rapidly advance the squared folded box blank between the conveyor belts C' of the subsequent processing equipment which may be a taping machine of conventional type such as that put out by Universal Corrugated Box Machinery Corporation and this machine will thereupon apply tape to the juxtaposed edges of the squared folded box blank, the flaps being maintained square, even after release of the front alignment member by reason of the clamping action of rollers 231 and 221.

When rectifier 408 conducts, the junction 411 connected to the anode 409 of rectifier 408 will go negative as will the terminal 356, connected to resistor 355. Consequently, the capacitor 353 will be effectively short circuited and will discharge so that diode 349 will cut off to in turn cut off rectifier 344 and break the circuit to the pusher solenoid valve 170 controlling air actuator 164, and it will be spring returned to its retracted position.

When the trailing edge of the box blank moves past the photocell 365, the latter will again be illuminated and its resistance will drop so that capacitor 404 will also discharge. This will cause rectifier 408 to also cut off and as a result, solenoid valves 170", 170' will be de-energized and the gate 223 will move back to "Stop" position and the roller 221 will be lifted. Thereupon, the equipment is ready for the next box blank to be squared.

In the event the box blanks do not require squaring, it is merely necessary to open switch 318 to de-energize the light source and also open switch 375 to de-energize the control circuit. In addition, the switch 332 is set so that its contacts 328, 333 are in engagement so that the gate solenoid valve 170" will be energized to retain the gate out of the path of movement of the box blank.

As a result, the box blanks can be advanced by the conveyer through the squaring equipment without any action by the latter.

With the equipment above described, box blanks can be squared at a high rate of speed and with assurance that no jamming can occur.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for squaring the panels of a folded box blank, comprising an alignment member, movable into and out of the path of said box blank and against which the leading edge of such box blank is adapted to abut with the gap between the folded top panels of such blank extending at right angles to said alignment member, electric solenoid control means to actuate said alignment member and normally retaining the latter in the path of movement of said box blank, a horizontally reciprocable pusher member movable against the trailing edge of such box blank to force the leading edge thereof against said alignment member thereby squaring the panels of such blank, electric solenoid control means to actuate said pusher member and normally retaining the latter in retracted position, a vertically reciprocable presser roller movable against the panels of the squared box blank to retain the latter in squared condition, electric solenoid control means to actuate said pusher member and normally retaining the roller in raised position, a photocell having a source of light, a conveyer to advance such box blanks in sequence in substantially a horizontal plane between the photocell and the source of light to interrupt the light impinging on said photocell and a control circuit controlling said photocell and controlling said electric solenoids to effect actuation of said alignment member, said pusher member and said pressure roller in timed sequence.

2. The combination set forth in claim 1 in which each of said electric solenoid control means comprises a spring urged valve, the valves controlling said pusher member and said pressure roller are normally spring urged to retain said pusher member in retracted position and said presser roller in raised position and the valve controlling said alignment member is normally spring urged to retain said alignment member in the path of said box blank, said control circuit comprising three manually operable switches controlling said respective electric solenoids, whereby upon actuation of such switch said solenoids may be individually actuated.

3. The combination set forth in claim 1 in which each of said electric solenoid control means comprises a spring urged valve, the valves controlling said pusher member and said pressure roller are normally spring urged to retain said pusher member in retracted position and said presser roller in raised position and the valve controlling said alignment member is normally spring urged to retain said alignment member in the path of said box blank, said control circuit comprising a first and second capacitor each having a charging circuit and a discharge circuit, said photocell presenting a low impedance when energized by the light source and being part of said discharge circuits of said capacitors, the charging circuit of the first of said capacitors having a shorter time constant than that of the second, an energization circuit connected between said first capacitor and the electric solenoid controlling said pusher member, a second energization circuit connected between said second capacitor and the electric solenoids controlling said presser roller and said alignment member, whereby when the light to said photocell is interrupted its impedance will rapidly rise to effect charging of said first capacitor prior to the charging of said second capacitor to effect energization of said pusher solenoid to advance the pusher member to square the box blank and subsequently to effect energization of said presser roller solenoid to lower the presser roller to retain the box blank in squared condition and to effect energization of such alignment solenoid to move the gate out of the path of said box blank.

4. The combination set forth in claim 3 in which means are provided to vary the time constant of each of said charging circuits.

5. The combination set forth in claim 3 in which means are provided upon energization of said pressure roller and alignment member solenoids to discharge said first capacitor thereby to de-energize said pusher member solenoid for retraction thereof.

6. The combination set forth in claim 3 in which a normally cut-off diode is connected in series in the energization circuit of said second capacitor and is also connected to the charging circuit of said first capacitor whereby upon charging of said second capacitor the diode will conduct to discharge said first capacitor thereby to de-energize said pusher member solenoid for retraction thereof.

7. The combination set forth in claim 3 in which each of said charging circuits comprises a variable resistor connected at one end to one side of the associated capacitor, each of said discharge circuits comprises a resistor connected at one end to the junction between said series connected capacitor and variable resistor, and at its other end to one side of said photocell, means connecting the other side of said photocell to the other side of said capacitors, means to apply a source of potential to said other side of said photocell and to the other end of said variable resistor, said energization circuits being connected between the junction between said capacitor and variable resistor and the associated electric solenoids.

8. The combination set forth in claim 7 in which a time delay relay is connected in series between the source of potential and the other side of said photocell.

9. The combination set forth in claim 7 in which a normally cut-off diode is connected in series with the energization circuit of said second capacitor, a bias resistor is connected in parallel with said second capacitor, said diode being connected to the other end of the variable resistor associated with said first capacitor, whereby upon charging of said capacitor the current flow through said bias resistor will effect conduction of said diode, to permit discharge of said first capacitor thereby to de-energize said pusher solenoid for retraction thereof.

10. The combination set forth in claim 7 in which a normally cut-off diode rectifier is connected in series in the energization circuit of each capacitor, a bias resistor is connected at one end to the other side of each capacitor and at its other end to one side of said diode, a normally cut-off Zener diode is connected between the junction between said variable resistor and said capacitor and the other end of said bias resistor, whereby when the associated capacitor charges sufficiently for conduction of the associated Zener diode, current will flow through the associated bias resistor to effect conduction of the associated diode rectifier for current flow through the energization circuit.

References Cited
UNITED STATES PATENTS 3,027,817    4/1962    Loffler.
3,205,794    9/1965    Califano, et al.

WILLIAM W. DYER, JR., *Primary Examiner.*

WAYNE A. MORSE, JR., *Examiner.*